(12) United States Patent
Song et al.

(10) Patent No.: US 7,990,957 B2
(45) Date of Patent: Aug. 2, 2011

(54) METHOD AND DEVICE FOR SELECTING SERVICE DOMAIN

(75) Inventors: Jae-Seung Song, Seoul (KR);
Jong-Geun Ham, Gyeonggi-Do (KR);
Hédé Patrice, Saint-Germain-en-Laye (FR)

(73) Assignee: LG Electronics Inc., Seoul (KR)

( * ) Notice: Subject to any disclaimer, the term of this patent is extended or adjusted under 35 U.S.C. 154(b) by 199 days.

(21) Appl. No.: 12/295,279

(22) PCT Filed: Mar. 23, 2007

(86) PCT No.: PCT/KR2007/001437
§ 371 (c)(1),
(2), (4) Date: Feb. 4, 2009

(87) PCT Pub. No.: WO2007/114572
PCT Pub. Date: Oct. 11, 2007

(65) Prior Publication Data
US 2009/0185557 A1 Jul. 23, 2009

(30) Foreign Application Priority Data
Mar. 31, 2006 (KR) .................. 10-2006-0029931

(51) Int. Cl.
*H04L 12/66* (2006.01)
*H04L 12/28* (2006.01)
*H04L 12/56* (2006.01)
*H04J 3/16* (2006.01)
*H04J 3/22* (2006.01)

(52) U.S. Cl. ........ 370/354; 370/355; 370/356; 370/401; 370/466

(58) Field of Classification Search .......... 370/352–356, 370/401, 466
See application file for complete search history.

(56) References Cited

U.S. PATENT DOCUMENTS

| 6,907,034 B1 * | 6/2005 | Begis ........................ 370/354 |
| 2005/0025047 A1 | 2/2005 | Bodin et al. |
| 2005/0083899 A1 * | 4/2005 | Babbar et al. ............... 370/342 |
| 2005/0120505 A1 | 6/2005 | Tani |

FOREIGN PATENT DOCUMENTS

| KR | 10-2006-0014628 A | | 2/2006 |
| WO | WO 2004/112415 | * | 12/2004 |
| WO | WO-2005/039132 A1 | | 4/2005 |

* cited by examiner

*Primary Examiner* — Ronald Abelson
(74) *Attorney, Agent, or Firm* — Birch, Stewart, Kolasch & Birch, LLP

(57) ABSTRACT

A method and device for selecting a service domain in a system for setting a session for at least one or more services between at least two or more terminals, in which when receiving an INVITE message for setting a voice service related session from an originating terminal, it is decided whether to send the INVITE message to a server or to directly send the INVITE message to a terminating terminal according to user pre-registered information for a domain selection, and then the terminating terminal having received the INVITE message sends to a network a response message including domain selecting information for directly selecting a domain with respect to the voice service related session according to a user's selection.

11 Claims, 5 Drawing Sheets

PRIOR ART

[Fig. 3]

PRIOR ART

[Fig. 4]

PRIOR ART

[Fig. 5]

```
SIP/2.0 200 OK
Via: SIP/2.0/UDP pcscf2.visited2.net:5088;comp=sigcomp;branch=z9hG4bK361k21.1, SIP/2.0/UDP
scscf2.home2.net;branch=z9hG4bK764z87.1, SIP/2.0/UDP icscf2_s.home2.net;branch=z9hG4bK871y12.1, SIP/2.0/UDP
scscf1.home1.net;branch=z9hG4bK332b23.1, SIP/2.0/UDP pcscf1.visited1.net;branch=z9hG4bK240f34.1, SIP/2.0/UDP
[5555::aaa:bbb:ccc:ddd]:1357;comp=sigcomp;branch=z9hG4bKnashds7
Record-Route: <sip:pcscf2.visited2.net:5088;lr;comp=sigcomp>>, <sip:scscf2.home2.net;lr>, <sip:scscf1.home1.net;lr>,
<sip:pcscf1.visited1.net;lr>
Privacy: none
P-Access-Network-Info: 3GPP-UTRAN-TDD; utran-cell-id-3gpp=234151D0FCE11
From: <sip:user1_public1@home1.net>; tag=171828
To: <tel:+12125552222>;tag=314159
Call-ID: cb03a0s09a2sdfglkj490333
Cseq: 127 INVITE
Contact: <sip:[5555::eee:fff:aaa:bbb]:8805;comp=sigcomp>;+g.3gpp.cs-voice
Allow: INVITE, ACK, CANCEL, BYE, PRACK, UPDATE, REFER, MESSAGE, OPTIONS
Server: PMI-OEA2,
Domain-selection-for-Voice : CS
Content-Type: application/sdp
Content-Length: (...)
v=0
o=- 2987933615 2987933617 IN IP6 5555:: eee:fff:aaa:bbb
s=-
c=IN IP6 5555::eee:fff:aaa:bbb
t=0 0
m=message 3402 TCP/MSRP *
a=accept-types:text/plain text/html message/cpim
a=path:msrp://[5555::eee:fff:aaa:bbb]:3402/s234167;tcp
a=max-size:65536
```

REGISTER sip:registrar.home1.net SIP/2.0
Via: SIP/2.0/UDP [5555::aaa:bbb:ccc:ddd];comp=sigcomp;branch=z9hG4bKnashds7
Max-Forwards: 70
P-Access-Network-Info: 3GPP-UTRAN-TDD; utran-cell-id-3gpp=234151D0FCE11
From: <sip:user1_public1@home1.net>;tag=4fa3
To: <sip:user1_public1@home1.net>
Contact: <sip:[5555::aaa:bbb:ccc:ddd];comp=sigcomp>;expires=600000
Call-ID: apb03a0s09dkjdfglkj49111
Authorization: Digest username="user1_private@home1.net", realm="registrar.home1.net", nonce="",
uri="sip:registrar.home1.net", response=""
Security-Client: ipsec-3gpp; alg=hmac-sha-1-96; spi-c=23456789; spi-s=12345678; port-c=2468; port-s=1357
Require: sec-agree
Proxy-Require: sec-agree
CSeq: 1 REGISTER
Supported: path
Domain Selection Notification: 1
Content-Length: 0

METHOD AND DEVICE FOR SELECTING SERVICE DOMAIN

DISCLOSURE OF INVENTION

Technical Solution

This disclosure relates to a combination service, and more particularly, to a method and device for selecting a service domain.

A combination service performs two or more services between at least two or more users at the same time. Also, the combination service may refer to a service which combines at least two or more services among a first service based on a first network, a second service based on a second network, a third service based on a third network, and the like, between two or more users, to thus perform the combined services at the same time.

In order to perform a combined service between a first user and a second user, the first and second users should recognize information related to supportable services with respect to their counterpart, and negotiate available services therebetween.

Hereinafter, one exemplary combination service, e.g., CSI (Combination of CS and IMS services), will be described.

CSI is a service which combines a CS (Circuit Switched) service and an IMS (IP Multimedia Subsystems) service, between the first and second users, and thus simultaneously performs the combined service therebetween. IMS is an A11-IP based core network technology for allowing combination of wired/wireless environments, namely, an infrastructure for providing multimedia services. The IMS service may refer to a service provided based on the IMS technology.

An IMS session for the IMS service may be added to a CS call set between the first user and the second user, or a CS call may be added to an IMS session set between the first user and the second user. IMS services which may be added to the preset CS call between the first and second users may include one or more of IMS based services such as IM (Instant Messaging), video sharing, data delivery, and the like.

Figure 1:
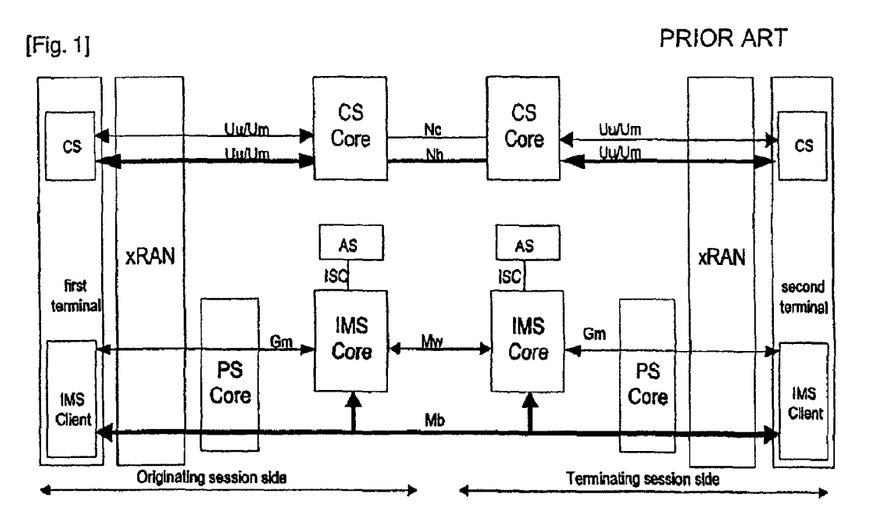
FIG. 1 illustrates a network architecture for providing a typical combination service between a first terminal and a second terminal.

FIG. 1 illustrates a network architecture for providing a typical combination service, for example, CSI, between a first terminal and a second terminal. As illustrated in FIG. 1, a typical network for providing the combination service, for example, CSI, may include first and second terminals 10 and 20 each of which has a CS service access function and an IMS service access function, first and second CS domains 31 and 32 each of which provides a CS service, first and second IMS domains 41 and 42 each of which provides an IMS service, a first PS (Packet Switched) domain 40 which is connected to the first IMS domain 41, and a second PS domain 45 which is connected to the second IMS domain 42.

The first and second terminals 10 and 20 may be CSI UEs (User Equipment), CSI mobile communications terminals, etc. The CSI terminal such as CSI UE is described hereafter. The CSI terminal is typically able to perform communication by simultaneously opening both CS bearer and PS bearer. The CSI terminal denotes a terminal which can perform communication via the CS bearer (i.e., CS domain) for voice media, and via the PS bearer (i.e., PS domain) and an IMS bearer (i.e., IMS domain) for several IMS services (e.g., message, white board, etc.) other than the voice media.

A network for providing the CSI may include a first x-RAN (x-Radio Access Network) which allows the first terminal 10 to be connected to both the first CS domain 31 and the first PS domain 40, and a second x-RAN 33 which allows the second terminal 20 to be connected to both the second CS domain 32 and the second PS domain 43.

Each of the first and second CS domains 31 and 32 includes at least MSC (Mobile Switching Center), VLR (Visiting Location Register), and HLR (Home Location Register).

Among at least two or more users (e.g., between the first and second terminals 10 and 20), a CSI session is set by combining a CS call for voice media (voice component) and an IMS session for the IMS service, and the CSI service can accordingly be performed via the CSI session.

Description will now be given of a typical method for setting a session in which a voice call and an IMS session is combined between at least two or more terminals in a typical CSI network. The voice call may be referred to as voice media session, voice component session, voice related session, or the like. The IMS session may be a session of other media except voice (i.e., non-voice session). The other media may denote messages, video, or the like.

Figure 2:
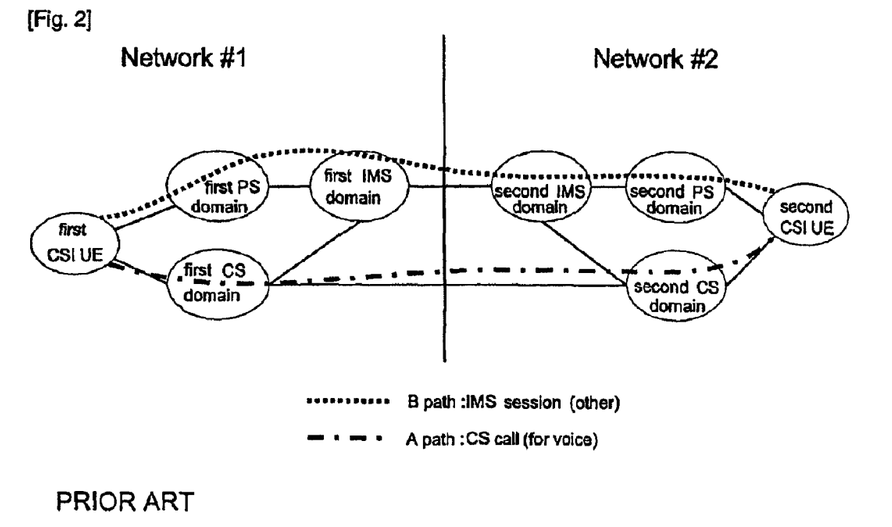
FIG. 2 illustrates a general format that a session obtained by combining a CS call and an IMS session is established between CSI terminals.

FIG. 2 illustrates a state that a session in which a CS call and an IMS session have been combined is set between CSI terminals.

When an originating terminal (e.g., a first CSI UE) desires to set a combined session in which a CS call for voice component and an IMS session for an IMS service are combined, the CS call setup and the IMS session setup are independently initiated.

When a terminating terminal is a second CSI UE, the terminating terminal (e.g., a second CSI UE) is then connected to the CS domains (i.e., the first and second CS domains) for the voice component (A path), and connected to the IMS domains (i.e., the first and second IMS domains) for the IMS session (B path).

Thus, when the originating and terminating terminals are all the CSI UEs, a voice media session (possibly referred to as voice call) is set via the first and second CS domains, and an IMS session, i.e., non-voice media session, is set via the first PS domain, the first IMS domain, the second IMS domain, and the second PS domain.

In addition, in several cases of communication between CSI UEs, if the IMS session is first set and the CS session is set, as illustrated in FIG. 2, B session (i.e., IMS session) is set first between the first and second CSI UEs and then A session (i.e., CS call) is set via the first and second CS domains. In addition to the communication between the CSI UEs, even in the communication between CSI UE and CS-based UE, the voice component session is set via CS core networks, i.e., the CS domains.

As mentioned above, upon the performance of combination service between CSI terminals, the combined session is normally set without any specific subscription information such that the combination services can be normally performed.

However, assuming that an originating terminal is a terminal having an IMS function (i.e., IMS terminal) and a terminating terminal is a CSI terminal, upon receipt of a session setup request with respect to voice component from the IMS terminal via an IMS domain, problems in setting and processing a session may occur according to whether a network has subscription or registration information regarding the CSI terminal. Hereinafter, the IMS terminal is described. The IMS terminal generally denotes a terminal which does not support a CS domain access and performs every service only via an IMS domain. The IMS terminal sends voice media using VoIMS service of the IMS domain.

In addition, Table 1 below describes types of CSI UEs classified according to subscription and support of VoIMS function.

TABLE 1

| Type of CSI UE | Support of VoIMS | | Subscription |
|---|---|---|---|
| $1^{st}$ type | Not support | Not exist | Network has no information as to whether it is CSI terminal. |
| $2^{nd}$ type | Support | Not exist | |
| $3^{rd}$ type | Not support | Exist | Network has information as to whether it is CSI terminal based on subscription. |
| $4^{th}$ Type | Support | Exist | |

That is, for the first type of CSI UE, the network does not have subscription information related to the CSI terminal and the CSI terminal does not support the VoIMS function. For the second type of CSI UE, the network does not have subscription information related to the CSI terminal and the CSI terminal supports the VoIMS function. For the third type of CSI UE, the network has subscription information related to the CSI terminal and the CSI terminal does not support the VoIMS function. For the fourth type of CSI UE, the network has subscription information related to the CSI terminal and the CSI terminal supports the VoIMS function.

For the third and fourth types of the CSI terminals, the network has each subscription information of the CSI terminals. Accordingly, even when the IMS terminal initiates a setup request of a combined service including a voice call to the CSI terminals via the IMS domain, the network sends a call setup request to the CS domain of the CSI terminal for the voice call and sends a session setup request to the IMS domain of the CSI terminal for non-voice service, by allowing a CSI AS (Application Server) to perform a session management.

However, in case where a terminating terminal is a CSI terminal of which subscription information is not stored in the network, because the network does not have information as to which type of terminal is the terminating terminal, the network sends a setup request for the combined session to the CSI terminal without the session management by the CSI AS.

Figure 3:
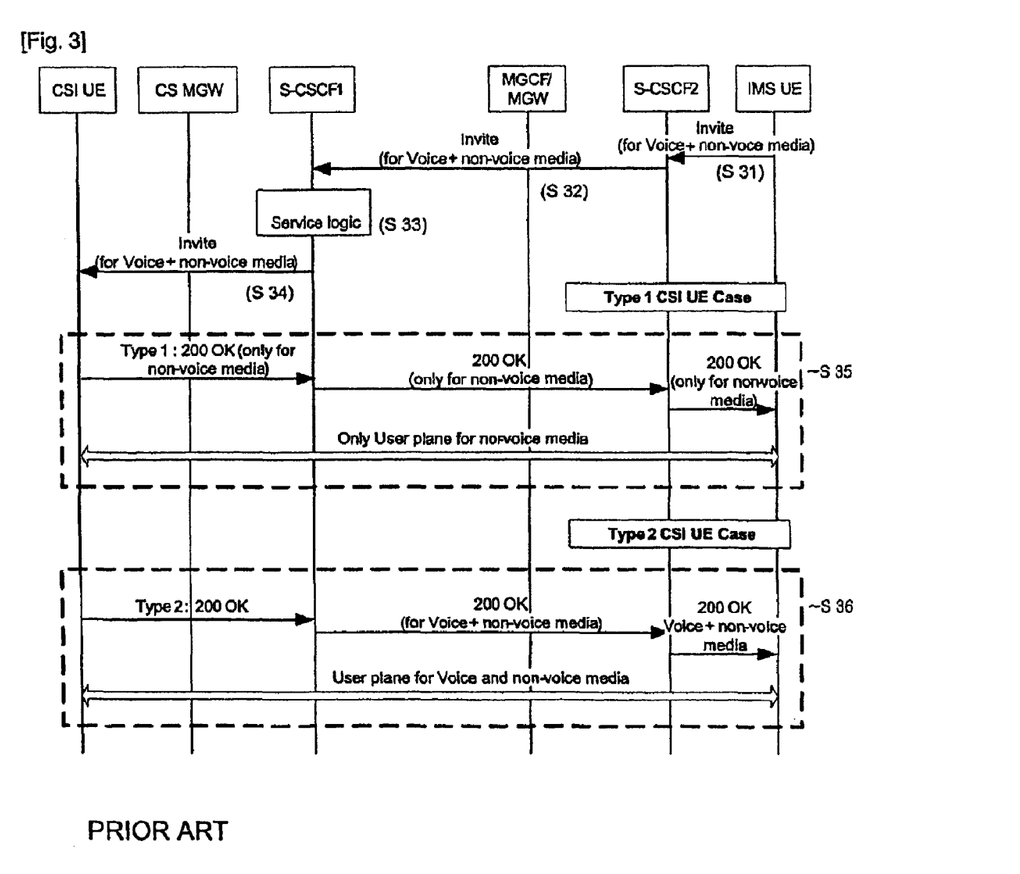
FIG. 3 illustrates a typical method for processing a setup request of a combined session forwarded from an IMS terminal in case of a terminating CSI terminal of which subscription information is not present in a network.

FIG. 3 illustrates a typical method for processing a setup request for a combined session sent from an IMS terminal in case where a terminating terminal is a CSI terminal of which subscription information is not stored in a network. That is, FIG. 3 illustrates a session setup procedure when there is a request for a session in which a voice media session is combined with a non-voice media session between the first and second types of the CSI terminals and an IMS terminal. As illustrated in FIG. 3, each of first and second S-CSCFs (Serving-Call Session Initiation Functions) performs registration using a SIP (Session Initiation Protocol) protocol and multimedia call (or session) processing function. Here, a service control unit may be used as indicating both the call control unit and the session control unit.

The IMS terminal sends a session setup message (INVITE) for requesting a setup of a session in which voice media and non-voice media are combined, for the voice media communication and non-voice media communication with a CSI terminal (S31).

The second S-CSCF of an IMS domain to which the IMS terminal belongs forwards the INVITE message to the first S-CSCF of an IMS core to which the CSI terminal belong (S32).

The first S-CSCF forwards the INVITE message to the CSI terminal using authentication and routing information with respect to the terminating terminal (S33 and S34).

When the CSI terminal has the first type, because the CSI terminal does not support the VoIMS function, the CSI terminal sends a response message with respect to the received INVITE message to indicate that the session setup is available for non-voice media component. Here, the voice component related session setup is failed.

The first S-CSCF forwards (send or deliver) the response message received from the CSI terminal to an IMS core to which the IMS terminal belongs, i.e., to the second S-CSCF. The second S-CSCF then forwards the response message to the IMS terminal. The response message may include a response indicating that the non-voice media component related session setup is available to be set.

The IMS terminal finally sets an IMS session only for the non-voice media component to generate a user plane with respect to the non-voice media, according to the information included in the response message. Therefore, the IMS terminal performs only non-voice media communication with the CSI UE. As a result, the session for the voice component included in the initial INVITE message is failed to be set (S35).

In the meantime, in case where the CSI terminal received the INVITE message is the second type of the CSI terminal, because the CSI terminal supports the VoIMS function, the CSI terminal sends a response message with respect to the INVITE message to indicate that a session is available to be set for both the voice and non-voice media components.

The response message sent from the CSI terminal is forwarded to the IMS terminal via the first and second S-CSCFs.

The IMS terminal sets an IMS session including both the voice and non-voice media components based on the contents included in the response message by adapting a normal IMS session setup procedure. Therefore, a user plane for each of the non-voice media and the voice component are generated via the PS domain. Accordingly, the IMS terminal and the CSI terminal can communicate the voice media and the non-voice media with each other.

As aforementioned, the CSI terminal prefers to set the voice media session via the CS domain. However, a problem may occur when processing the request for a call session setup sent from the IMS terminal to the CSI terminal according to the subscription, registration and support of VoIMS each related to the CSI terminal.

That is, in the method for selecting the domain for the typical combination service, even when the CSI terminal does not support the VoIMS function (i.e., in case of the first type of CSI terminal), the voice media component session should be set via the CS domain but it is erroneously failed.

Furthermore, when the subscription information related to the CSI terminal which supports the VoIMS function is not stored in the network (i.e., in case of the second type of CSI terminal), the network which received the session setup message sent by the IMS terminal forwards the session setup message immediately to the CSI terminal (i.e., the terminating terminal). The CSI terminal prefers to set the voice component session via the CS domain, but the voice component session is set via the IMS domain over the PS domain. When the voice component session for the CSI terminal is set via the PS domain, the service quality of the voice component session degrades comparing the case where the session set via the CS domain.

Therefore, this disclosure is to provide a method and device for selecting a service domain capable of selecting a network for a voice related session by confirming user's pre-subscription information for a domain selection or domain selecting information included in a specific response message sent by a terminating terminal.

This disclosure is also to provide a method and device for selecting a service domain capable of allowing an IMS core network to select a voice media domain for a CSI terminal regardless of subscription information related to a CSI terminal and whether the CSI terminal supports VoIMS.

There is provided a method for selecting a service domain, when a session for at least one or more services are set between a plurality of terminals, the method comprising: receiving, by a second terminal, a session setup message sent by a first terminal; and sending, by the second terminal, a response message which includes domain selecting information with respect to a specific media session.

In another embodiment of this disclosure, a method for selecting a service domain comprises: selectively performing, by a service control unit, a service domain selecting function based on user's pre-registered information when a session for at least one or more services are set between a plurality of terminals.

There is also provided a service control device, in a system for setting a session for at least one or more services between at least two or more terminals, comprises: a service control unit which selectively performs a service domain selecting function according to domain selection notification information having previously registered.

There is also provided a terminal, in a device for setting a combined session including at least one or more session type information between at least two or more terminals, comprises: a controller which sends a specific response message including domain selecting information for selecting a domain with respect to information related to a specific session type information in case of receiving a session setup message.

Hereinafter, preferred embodiments of a method and device for selecting a service domain will be described with reference to the accompanying drawings.

In this disclosure, a CSI terminal sends domain selecting information to a core network or stores user pre-registered information for a domain selection, i.e., domain selection notification information in the core network, so as to normally or dynamically process a setup of a voice component session received from a VoIMS-supportable IMS terminal. The domain selecting information may include specific session type information with respect to the CSI terminal, i.e., preference information and available domain information each with respect to specific media (e.g., voice component). For example, the domain selecting information may indicate a voice component processing method.

That is, this disclosure proposes two embodiments below, in order to set a voice related session toward a non-subscription based CSI terminal of which subscription information is not stored in a network, and to use user environment and preference, which are dynamically changed, for a domain selection of voice related session.

A first embodiment describes a method in which a CSI terminal sends a specific response message including domain selecting information to an IMS core network to allow separating, combining and forwarding of a voice related session. That is, in case where a received INVITE message indicates that a session including a voice service is desired to be set, a core network forwards (send or deliver) the INVITE message to the CSI terminal. The CSI terminal sends a response message to the core network, the response message including domain selecting information indicating that it desires to set a session for the voice service by switching a domain from an IMS domain into a CS domain. The core network then performs separating, combining and forwarding with respect to the voice related session, based on the domain selecting information included in the response message.

A second embodiment describes a method in which even if an operator policy has already been applied to an IMS core network and thereby a specific media related session is terminated in a particular domain, a user registers domain selection notification information for a domain selection notification, such that the user can directly select a terminating domain for the specific media related session (e.g., voice media related session).

In other words, when a user of a CSI terminal desires to directly decide a domain selection for a voice service according to his dynamic environment, upon an IMS registration of the CSI terminal, the user additionally registers domain selection notification information for a domain selection notification. Therefore, the core network queries the user of the CSI terminal as to a voice service domain selection according to the user's pre-registered information (i.e., the domain selection notification information). The CSI terminal sends preferred domain information related to the voice related session selected by the user to the core network. The core network selects a domain according to the user's preferred domain information to perform a process of setting the voice related session. Hence, the user can directly select a terminating domain for the voice service to be suitable for his current environment.

First, the first embodiment of the method for selecting the service domain will be described with reference to FIG. 4.

Figure 4:
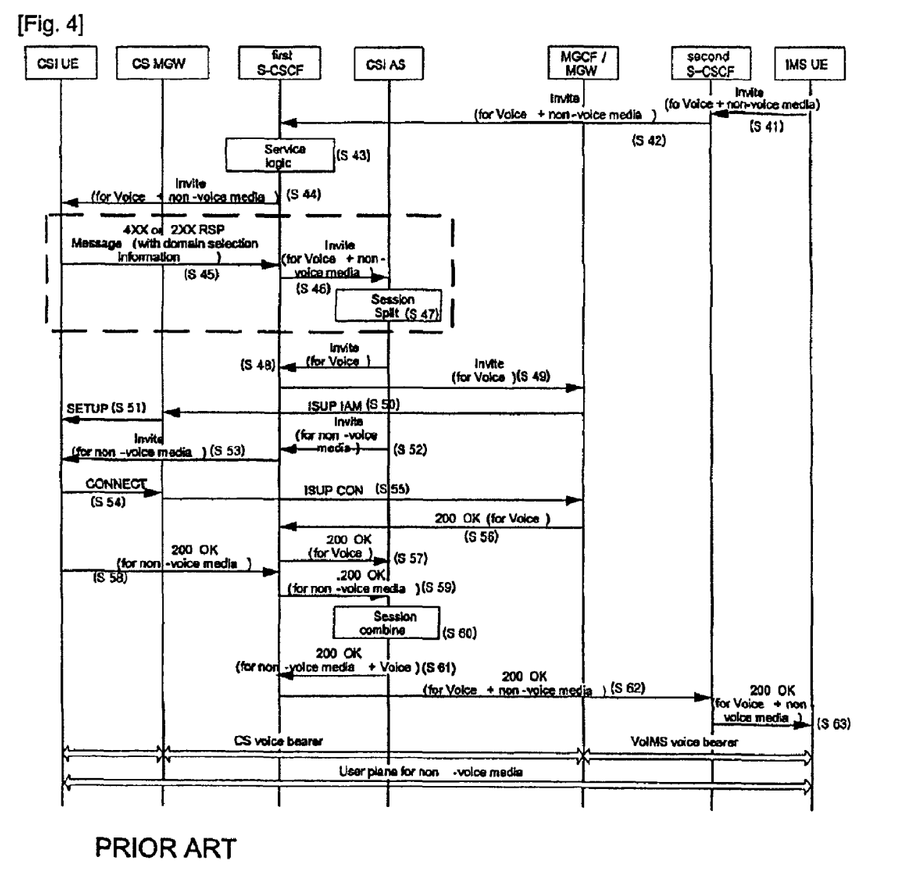
FIG. 4 illustrates a first embodiment of a method for selecting a service domain.

FIG. 4 illustrates a first embodiment of a method for selecting a service domain. As illustrated in FIG. 4, when a CSI terminal sends to an IMS domain a SIP response message including domain selecting information which indicates that a voice service related session should be set by switching a domain from an IMS domain into a CSI domain, the IMS domain sets the voice service related session via the CS domain.

A system for selecting the service domain according to this disclosure, as shown in FIG. 4, is comprised of an originating terminal, an originating side IMS domain, a terminating side IMS domain, a terminating side CS domain and a terminating terminal.

If the originating terminal is an IMS terminal and the terminating terminal is a CSI terminal, the originating side IMS domain may include a second service control unit, the terminating side IMS domain may include a first service control unit, a CSI AS (Application Server), and MGCF/MGW (Media Gateway Control Function/Media Gateway), and the terminating side CS domain may include a CS MGW. Each service control unit may include at least one of a CSCF (Call Session Control Function), a call control function, and a session control function. FIG. 4 shows a case that the second service control unit is a second S-CSCF (Serving-CSCF), and the first service control unit is a first S-CSCF.

The CSI terminal may include a controller (not shown) such that when receiving a setup request for a session including voice component from an IMS domain, it sends to the IMS domain a response message including domain selecting information indicating that a voice related session is separated from the session including the voice component to be set via the CS domain. The domain selection information, for example, may include one of session split indication information which indicates that a voice related session should be separated to be set via a CS domain, and session transfer indication information which indicates that a voice related session should be combined with another service related session to be set via an IMS domain. The domain selection information, for another example, may include one of a first value which indicates that a voice related session should be split to be set via a CS domain, and a second value which indicates that a voice related session should be combined with another service related session to be set via an IMS domain.

Each of the first and second S-CSCFs performs a registration using a SIP (Session Initiation Protocol) protocol and a call processing function. Also, the first S-CSCF checks registration information related to a CSI terminal, when receiving a session setup message for setting a combined session including one or more session type information, thus to decide whether to forward the session setup message to the CSI terminal or the CSI AS.

Here, since the originating terminal and the terminating terminal adapt different service coverage from each other, description is given of a case that they belong to different S-CSCFs (i.e., the first and second S-CSCFs). However, if the originating terminal and the terminating terminal adapt the same service coverage, both the originating and the terminating terminals belong to a common S-CSCF (i.e., corresponding to a case that the first and second S-CSCFs are the same each other). This case is not shown in FIG. 4.

The CSI AS denotes a control unit which performs changing, separating or combining of combined session including at least one or more session type information based on the type of each session.

The session type information may be a voice component or non-voice component. The non-voice component may include an IMS service. The IMS service may be a messaging service, a white board, or the like.

If the session type information indicates a session only including a voice component, the CSI AS performs a function of transferring the corresponding session to a CS domain. In case of a combined session including voice component and another IMS service information, the CSI AS splits the combined session into the voice component and the another IMS service component. The CSI AS attempts to set a session toward a CS domain for the voice component, and attempts to set a session toward an IMS domain for the another IMS service component. The CSI AS then gets each response to combine the sessions.

The MGCF/MGW performs a signaling and call control cooperation with a typical PSTN (Public Switched Telephone Network), and provides a circuit bearer and a packet media stream channel. The CS MGW provides a circuit bearer and a packet media stream channel.

Hereinafter, the first embodiment of the method for selecting the service domain is described in detail.

An IMS terminal sends a session setup message (e.g., INVITE message) for setting a combined session including at least one or more session type information with a terminating terminal, e.g., a combined session for a SIP based service based on voice and non-voice media (S41).

A second S-CSCF of an IMS core in which the IMS terminal (i.e., an originating side IMS domain) resides forwards the INVITE message to an IMS core in which a CSI terminal resides according to a normal IMS session setup procedure (S42).

A first S-CSCF of the terminating side IMS domain checks information related to the terminating terminal from a HSS (Home Subscriber Server) (not shown) to decide an entity to send the INVITE message thereto. The information related to the terminating terminal, for example, may include authentication information, routing information, subscription information (or the CSI terminal type information), and the like.

If the terminating terminal is a CSI terminal having no subscription, the first S-CSCF does not forward the INVITE message to the CSI AS but forwards it directly to the CSI terminal (S43 and S44). However, if the terminating terminal is a CSI terminal having subscription, the first S-CSCF forwards the INVITE message directly to the CSI AS (S46).

The HSS adds user's pre-registered information for a voice domain selection (i.e., domain selection notification information) into the information related to the terminating terminal for storage (the domain selection notification information may be stored by the user of the terminating terminal upon an IMS registration, and a storing method therefor will be described later).

Thus, when receiving the INVITE message, the first S-CSCF takes the user's pre-registered information for the voice domain selection (i.e., the domain selection notification information) out of the HSS, thus to decide an entity to forward the INVITE message thereto.

That is, the first S-CSCF can decide, according to the domain selection notification information, whether to forward the INVITE message to the terminating terminal (e.g., CSI terminal) in order for the user of the terminating terminal to directly select a voice domain, or whether to forward the INVITE message to the CSI AS in order to set the combined session based on the subscription information stored in the HSS (the domain selection notification information will be explained later).

As represented at the step S44, it is described that the INVITE message has been forwarded to the CSI terminal from the first S-CSCF.

For a first type of CSI terminal, the CSI terminal does not support VoIMS function but prefers to set a connection for a voice service via a CS domain. Also, even for a second type of CSI terminal, the CSI terminal supports the VoIMS function but prefers to set the connection for the voice service via the CS domain.

The CSI terminal which received the INVITE message decides to separate a voice media session from the combined session to generate domain selection information. The CSI terminal includes the domain selecting information in a response message indicating that a session setup is available for both voice and non-voice media components and sends the response message to the first S-CSCF (S45). The response message is a SIP message.

Figure 5:
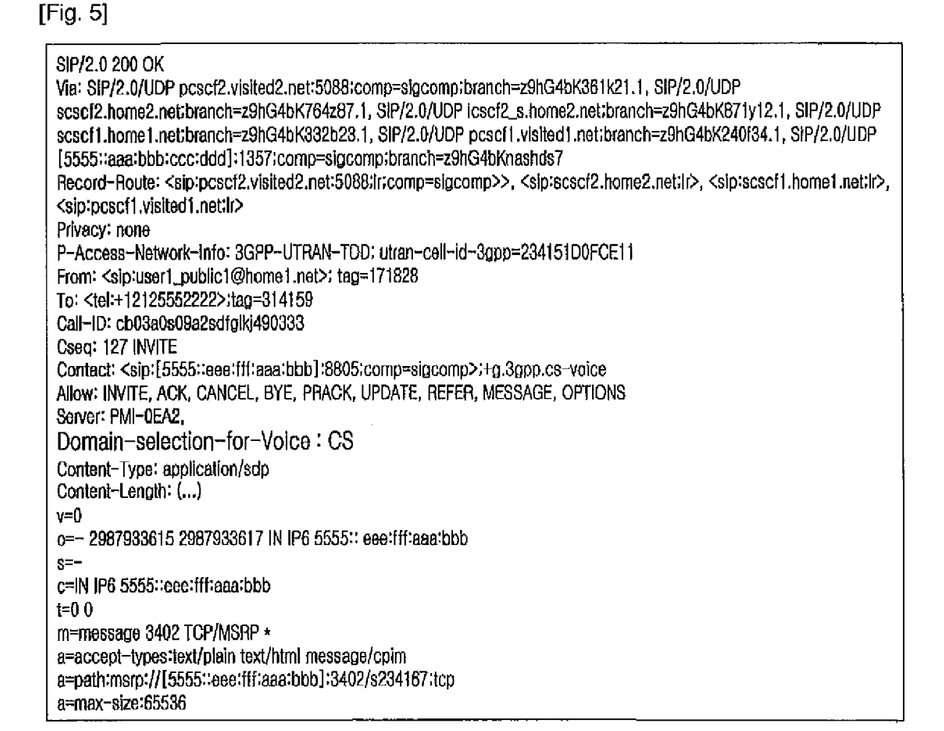
FIG. 5 illustrates an exemplary format of a response message of a terminating terminal including domain selecting information for selecting a voice session domain.

The domain selecting information may be included in a heater or body of the response message in a format as shown in FIG. 5.

FIG. 5 illustrates an exemplary format of a response message of a terminating terminal including domain selecting information for notifying (indicating) a voice related session via a CS domain.

The domain selecting information may be represented by a parameter called as Domain-selection-for-voice, for example. If the domain-selection-for-voice parameter value indicates a CS domain (e.g., for "CS"), the first S-CSCF can recognize that the session with respect to a voice service should be set via the CS domain.

The first S-CSCF confirms the domain selecting information (e.g., domain-selection-for-voice parameter) included in the response message received from the CSI terminal, to recognize that the voice related session should be set via the CS domain for the CSI terminal, thereby deciding to forward the INVITE message to the CSI AS. Therefore, the INVITE message for setting the combined session including both the voice and non-voice media is forwarded to the CSI AS from the first S-CSCF (S46).

The CSI AS checks the INVITE message received to recognize that the setup requested combined session includes at least one or more session type information (e.g., voice and non-voice media). The non-voice media may include video. The CSI AS then splits the combined session into the voice related session and a non-voice media related session (S47).

Afterwards, the CSI AS sends the voice session setup message (INVITE (voice media) message) for setting the voice related session to the first S-CSCF of the terminating side IMS domain (S48). The voice session setup message may include routing information to be sent to the CS domain.

The first S-CSCF then forwards the received voice session setup message to the MGCF for sending it to the CS domain (S49).

The MGCF converts the received voice session setup message into an ISUP (ISDM User Part) IAM (Initial Address Message) to send the message to the CS domain (which is a type of call setup message) and then sends the changed ISUP IAM to the CS MGW (S50).

The CS MGW converts the ISUP IAM message into a SETUP message to forward to the CSI terminal via the terminating side CS domain (S51).

Meanwhile, the CSI AS sends to the first S-CSCF a non-voice media session setup message (INVITE (non-voice) message) for setting one of the split sessions at the step S47, i.e., a non-voice media related session, according to a typical IMS call procedure (S52).

The first S-CSCF forwards the received non-voice media related session setup message to the CSI terminal (S53).

On the other hand, the CSI terminal sends a CONNECT message to the CS MGW when being accepted for the SETUP message of the voice message received via the CS domain (S54).

The CS MGW converts the received CONNECT message into an ISUP CON message to send to a MGCF of the terminating side IMS domain (shown as MGCF/MGW in FIG. 4) (S55).

The MGCF changes the received ISUP CON message into a response message with respect to the voice related setup message (e.g., 200 OK (voice media) message) (or referred to as a voice session response message), and then sends the voice session response message (e.g., 200 OK (voice media) message) to the first S-CSCF (S56).

The first S-CSCF then forwards the received voice session response message to the CSI AS (S57).

The CSI terminal sends to the first S-CSCF a 200 OK (non-voice media) response message (i.e., non-voice media session response message) in response to a non-voice media IMS session setup message (S58).

The first S-CSCF then forwards the received 200 OK (non-voice media) message (non-voice media session response message) to the CSI AS (S59).

The CSI AS analyzes both the voice session response message received at the step S57 and the non-voice media session response message received at the step S59, so as to check the successful reception of both the responses with respect to the voice session setup message and the non-voice session setup message. The CSI AS then combines the voice media session with the non-voice media session (S60).

The CSI AS sends to the first S-CSCF a response message (e.g., 200 OK (voice+non-voice media) message) including the responses with respect to the voice and non-voice media (S61).

The first S-CSCF forwards, to the second S-CSCF of the originating side IMS domain, the response message (e.g., 200 OK (voice+non-voice media) message) including the information related to voice and non-voice media, according to a typical IMS procedure (S62).

The second S-CSCF then forwards the received response message to the IMS terminal (S63).

As such, the voice media service forms a bearer via the IMS domain of the IMS terminal and the CS domain of the CSI terminal, and the non-voice media service forms a bearer via the IMS domain of the IMS terminal and the IMS domain of the CSI terminal. Therefore, the IMS terminal and the CSI terminal can transmit and receive voice and non-voice media via the preferred domains.

Hereinafter, a second embodiment of a method for selecting a service domain will be illustrated with reference to FIG. 6.

The CSI terminal registers domain selection notification information such that a user can directly select a PS domain or CS domain with respect to a session related to a voice service upon an IMS registration. Thereafter, when the IMS core network of the CSI terminal has received a setup request for the corresponding session, domain selection notification information pre-registered is checked to allow the session setup request to be forwarded to the CSI terminal.

That is, if an operator has previously set a voice related session by the CSI AS such that the voice related session can be automatically connected via the CS domain, every voice service is connected via the CS domain. However, when a user desires to directly select a domain for a voice service according to his various environments or preferences, those policies may previously restrict the user's selection.

Therefore, if the user desires to directly select the voice session domain as mentioned above, the CSI terminal also registers domain selection notification information for a direct selection of the voice session domain when performing an IMS registration.

After the registration, in order to set a session for a voice service, an INVITE setup message sent by an IMS terminal is first forwarded to an IMS domain of the CSI terminal according to the domain selection notification information.

Once the CSI terminal selects a domain, in case of using VoIMS for the voice service, the CSI terminal itself sends a response with respect to the corresponding session to the IMS core network according to a normal IMS procedure. Alternatively, the CSI terminal may include in the response domain selecting information for indicating to select the IMS domain for the voice related session. The response is then forwarded to the IMS terminal via the IMS domain.

When the CSI terminal prefers the CS domain for the voice service, the CSI terminal sends domain selecting information for indicating the selection of the CS domain to the IMS core network, in order to request to set the voice service related session via the CS domain. The domain selecting information may include indication information which indicates separating, combing or forwarding of the voice related session.

As such, when desiring to set a combined session including at least one or more session type information, the forwarding, separating and combining for a session related to a specific session type information are performed.

Figure 6:
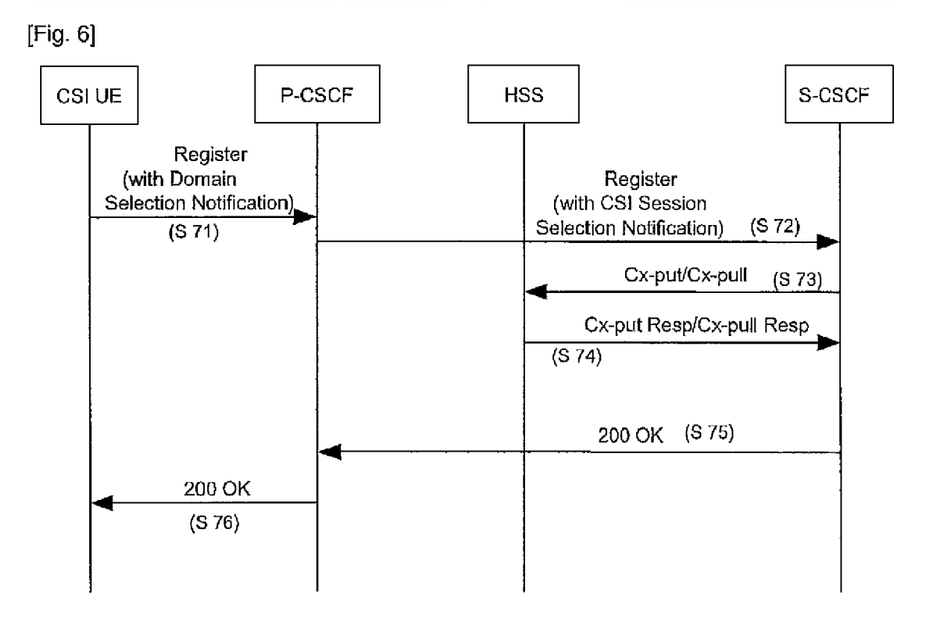
FIG. 6 illustrates a method for registering domain selection notification information in order for a user to directly select a domain with respect to a specific media related session.

FIG. 6 illustrates a method for additionally registering domain selection notification information in order for a user to directly select a domain with respect to a specific media related session when a CSI terminal performs an IMS registration.

In FIG. 6, P-CSCF (Proxy Call Session Control Function) denotes a first entity having a CSI terminal connected to an IMS network, and HSS (Home Subscription Server) combines and performs a HLR (Home Location Register) function of a typical mobile communication network and a function of managing mobility and authentication of a user using IP (Inter Protocol) multimedia. The HSS stores domain selection notification information for notifying whether a user would directly select a specific media related session domain of a particular terminal (e.g., whether a user would directly select a voice session domain of a CSI terminal).

The CSI terminal sends registration information to the P-CSCF through a registration message in order to perform an IMS registration. The registration information may include public user identity (ID), private user identity, home network domain name, and UE IP address. The CSI terminal additionally sends domain selection notification information (S71).

Figure 7:
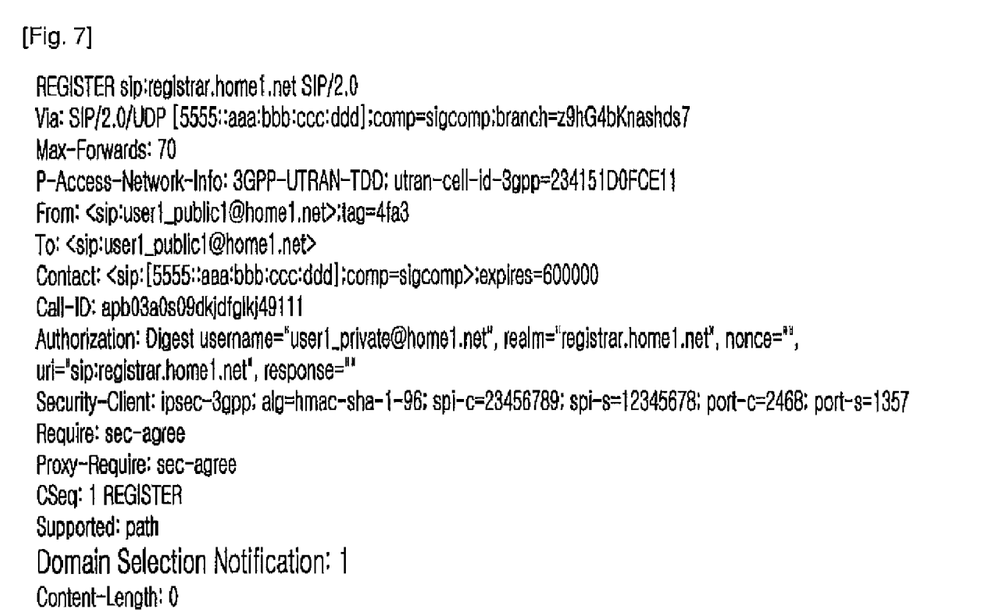
FIG. 7 illustrates an exemplary format of a registration message including domain selection notification information.

The domain selection notification information, as shown in FIG. 7, may be sent by being included in the registration message. When the domain selection notification information has a first value, it indicates that a user desires to directly select a terminating domain for a specific media related session. When the domain selection notification information has a second value, it indicates to perform a procedure in which a domain (preset domain) having selected by an operator should be selected by a CSI AS. The first value may be set to "TRUE" or "1", and the second value may be set to "FALSE" or "0".

After receiving the registration message, the P-CSCF checks a particular entity of a home network, i.e., I-CSCF (Interrogation-call Session Control Function) (not shown) by using the home network domain name included in the registration information. The P-CSCF sends the registration message to a S-CSCF via the checked I-CSCF (S72).

The S-CSCF additionally sends to the HSS its own name information together with the registration information included in the registration message, namely, public user ID, private user ID, and domain selection notification information, so as to request registration from the HSS (S73).

The HSS then registers the registration information for the CSI terminal and the S-CSCF name information, and sends a registration response message to the S-CSCF (S74).

After the domain selection notification information is registered in the HSS to indicate that a user desires to directly select a voice session domain, the HSS can recognize that the session setup request should be sent not to the CSI AS but directly to the CSI terminal when receiving the setup request for the session related to the voice media. Also, this information is conserved in the S-CSCF while the CSI terminal is registered in the HSS.

The S-CSCF then sends a registration response message (200 OK) to the P-CSCF via the I-CSCF of the home network. The P-CSCF forwards the response message to the CSI terminal (S76).

Afterwards, the method for selecting the domain illustrated in FIG. 4 may be performed.

The registration of the domain selection notification information may be performed previously or while the service is in progress.

The embodiments illustrated in this disclosure are merely part of various embodiments. Thus, the terminal (device) may be applicable to a terminal (device) supporting a session service or various protocols based on the SIP. In the combination service using different service domains, different protocols or different service types, the user can select a domain, a service protocol or a service type for each session according to capability of the terminal or user preferences. Alternatively, a session control unit (or call control unit) can select a domain, a service protocol or a service type for each session according to user's pre-registered information.

As described above, the method and device for selecting a service domain provided in the disclosure can be implemented such that when receiving, from an IMS terminal, an INVITE message indicating that the IMS terminal desires to set a session related to a voice service, the INVITE message is directly sent to a terminating terminal according to user's pre-registered information for a domain selection to allow a user to directly select a domain for the session related to the voice service.

This disclosure can also be implemented such that a CSI terminal sends to a network a specific response message including domain selecting information for selecting a domain for a specific media related session, and accordingly the network is allowed to perform separating, combining and forwarding for the specific media related session according to the domain selecting information included in the specific response message.

Therefore, this disclosure can select a user preferred domain regardless of whether a terminal has subscription and whether the terminal supports VoIMS function. Also, a service with better quality can be provided by connecting an appropriate voice related session according to user's current environment and preference and supportable domain.

The invention claimed is:

1. A method for selecting a service domain, when a session for at least one or more service is set between a plurality of terminals, the method comprising:
receiving, by a second terminal, a session setup message sent by a first terminal;
sending, by the second terminal, a response message, the response message including domain selecting information with respect to a specific media session; and
checking, by a CSCF (Call Session Control Function), the domain selecting information included in the response message to forward the session setup message to a server,
wherein the server performs separating and combining of the specific media session according to the domain selecting information, and the specific media session is separated to be set via a domain selected by the second terminal.

2. The method of claim 1, wherein the receiving step comprises:
checking registered domain selection notification information by the CSCF which received the session setup message; and
forwarding, by the CSCF, the session setup message to the second terminal according to the domain selection notification information.

3. The method of claim 1, wherein the sending step comprises:
selecting the domain with respect to the specific media session, by the second terminal having received the session setup message, to generate domain selecting information; and including the domain selecting information in the response message and sending the response message.

4. The method of claim 1, wherein the specific media session is a CS (Circuit Switched) call.

5. The method of claim 1, wherein the domain selecting information includes one of
- a first value which indicates the voice related session should be separated to be set via a CS (Circuit Switched) domain; and
- a second value which indicates a voice related session should be combined with another media related session to be set via an IMS (IP Multimedia Subsystems) domain.

6. A method for selecting a service domain, comprising:
- selectively performing, by a service control unit, a service domain selecting function based on a user's pre-registered information when a session for at least one or more services are set between a plurality of terminals; and
- selectively sending, by the service control unit, a session setup message of an originating terminal to one of a terminating terminal and a server based on the pre-registered information,
- wherein the pre-registered information includes one of a first value which indicates a service domain selection by the terminating terminal and a second value which indicates a service domain selection by the server.

7. The method of claim 6, wherein if the pre-registered information has the first value, the service control unit directly sends the session setup message to the terminating terminal.

8. The method of claim 7, wherein the terminating terminal which received the session setup message selects a service domain with respect to a specific media session and sends a response message including domain selecting information.

9. The method of claim 8, wherein the specific media session includes a voice call.

10. The method of claim 6, wherein if the pre-registered information has the second value, the service control unit sends the session setup message to the server.

11. The method of claim 6, wherein the pre-registered information is registered in a HSS (Home Subscriber Server) when performing an IMS registration.

* * * * *